United States Patent
Li et al.

(10) Patent No.: US 9,667,189 B2
(45) Date of Patent: May 30, 2017

(54) CONTROL OF ELECTRICALLY EXCITED SYNCHRONOUS MACHINE DRIVES FOR RIDE THROUGH AND CONTROLLED BRAKING OPERATIONS

(71) Applicant: ABB Technology Ltd., Zürich (CH)

(72) Inventors: Jun Li, Cary, NC (US); Zhiguo Pan, Cary, NC (US); Hongrae Kim, Cary, NC (US); Wen Ouyang, Apex, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/837,620

(22) Filed: Aug. 27, 2015

(65) Prior Publication Data
US 2017/0063277 A1    Mar. 2, 2017

(51) Int. Cl.
| | |
|---|---|
| *H02P 1/04* | (2006.01) |
| *H02P 29/02* | (2016.01) |
| *H02P 21/00* | (2016.01) |
| *H02P 3/02* | (2006.01) |
| *H02P 27/06* | (2006.01) |

(Continued)

(52) U.S. Cl.
CPC ........... *H02P 29/021* (2013.01); *H02P 3/02* (2013.01); *H02P 3/22* (2013.01); *H02P 3/26* (2013.01); *H02P 9/102* (2013.01); *H02P 21/0003* (2013.01); *H02P 21/005* (2013.01); *H02P 27/06* (2013.01)

(58) Field of Classification Search
CPC ........ H02P 29/028; H02P 3/12; H02P 29/024; H02P 3/22; H02P 6/08; H02P 9/00
USPC ........... 318/400.09, 722, 703, 706, 717, 273
See application file for complete search history.

(56) References Cited

U.S. PATENT DOCUMENTS

| | | |
|---|---|---|
| 3,593,103 A | 7/1971 | Chandler et al. |
| 3,781,614 A | 12/1973 | Mokrytzki et al. |

(Continued)

OTHER PUBLICATIONS

Holtz, J., Lotzkat, W., and Stadtfeld, S., "Controlled AC Drives with Ride-Through Capability at Power Interruption", IEE Transactions on Industry Applications, Sep./Oct. 1994,pp. 1275-1283, vol. 20, Issue 5.

(Continued)

*Primary Examiner* — Bentsu Ro
*Assistant Examiner* — Thai Dinh
(74) *Attorney, Agent, or Firm* — Taft Stettinius & Hollister LLP (57) ABSTRACT

One exemplary embodiment is method of operating an electrically excited synchronous machine (EESM) system. The system includes a converter operatively coupled with one or more stator windings, an exciter operatively coupled with one or more field windings, a controller operatively coupled with the converter and the exciter, and a power supply operatively coupled with the converter and the exciter. The controller determines whether a power supply fault condition exists and whether EESM system is operating in a motor mode or a generator mode. If the power supply fault condition exists and the EESM system is operating in the motor mode, entering one of a motor ride through control mode and a motor controlled braking control mode If the power supply fault condition exists and the EESM system is operating in the generator mode, entering one of a generator ride through control mode and a generator controlled braking control mode.

24 Claims, 4 Drawing Sheets

(51) Int. Cl.
*H02P 3/22* (2006.01)
*H02P 3/26* (2006.01)
*H02P 9/10* (2006.01)

(56) References Cited

U.S. PATENT DOCUMENTS

| | | | | |
|---|---|---|---|---|
| 4,949,021 | A * | 8/1990 | Rozman | F02N 11/04 318/400.11 |
| 5,070,290 | A * | 12/1991 | Iwasa | H02P 23/06 187/288 |
| 6,313,600 | B1 | 11/2001 | Hammond et al. | |
| 7,059,691 | B2 * | 6/2006 | Tsunehara | B60L 7/26 303/15 |
| 7,215,099 | B2 | 5/2007 | Ylppo et al. | |
| 7,378,808 | B2 * | 5/2008 | Kuras | B60K 6/46 307/10.1 |
| 8,473,132 | B2 * | 6/2013 | Ichikawa | B60K 6/445 180/65.25 |
| 8,626,368 | B2 * | 1/2014 | Hendrickson | H02M 7/44 701/101 |
| 8,760,095 | B2 * | 6/2014 | Iwaji | H02P 29/02 318/400.17 |
| 9,246,432 | B2 * | 1/2016 | Keen | B04B 9/10 |
| 2004/0245961 | A1 * | 12/2004 | Ueda | H02M 1/425 318/805 |
| 2005/0099146 | A1 * | 5/2005 | Nishikawa | B60W 20/11 318/63 |

OTHER PUBLICATIONS

Pyrhönen, Analysis and Control of Excitation, Field Weakening and Stability in Direct Torque Controlled Electrically Excited Synchronous Motor Drives, Lappeenranta University of Technology, 1998, 118 Pages.

Newman, et al., Voltage Sag Ride Through Improvement of Modern AC Drives: Review of Methods and a Case Study, Intergral Energy Power Quality Centre, School of Electrical, Computer and Telecommunications Engineering, 6 pages.

Kaukonen, Salient Pole Synchronous Machine Modelling in an Industrial Direct Torque Controlled Drive Application, Lappeenranta University of Technology, 1999, 150 Pages.

* cited by examiner

CONTROL OF ELECTRICALLY EXCITED SYNCHRONOUS MACHINE DRIVES FOR RIDE THROUGH AND CONTROLLED BRAKING OPERATIONS

BACKGROUND

The present disclosure relates to electric machines, and more particularly but not exclusively to electrically excite synchronous machines (EESMs) and the control thereof during power supply failure. EESM control remains an area of significant interest. Existing control proposals suffer from a number of shortcomings, drawbacks and disadvantages. For example, in the instance of power supply failure, supplemental energy storage may be necessary to maintain control of EESMs. Undesirable system operating conditions may also occur including, for example, drive trip events. Existing controls lack flexibility and robustness when faced with a multiplicity of power supply failure conditions. There remains a significant need for the unique apparatuses, methods, systems and techniques disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment comprises a unique electrically excited synchronous machine control system. Further embodiments, forms, objects, features, advantages, aspects and benefits shall become apparent from the following description and drawings.

DETAILED DESCRIPTION OF ILLUSTRATIVE EMBODIMENTS

Figure 1:
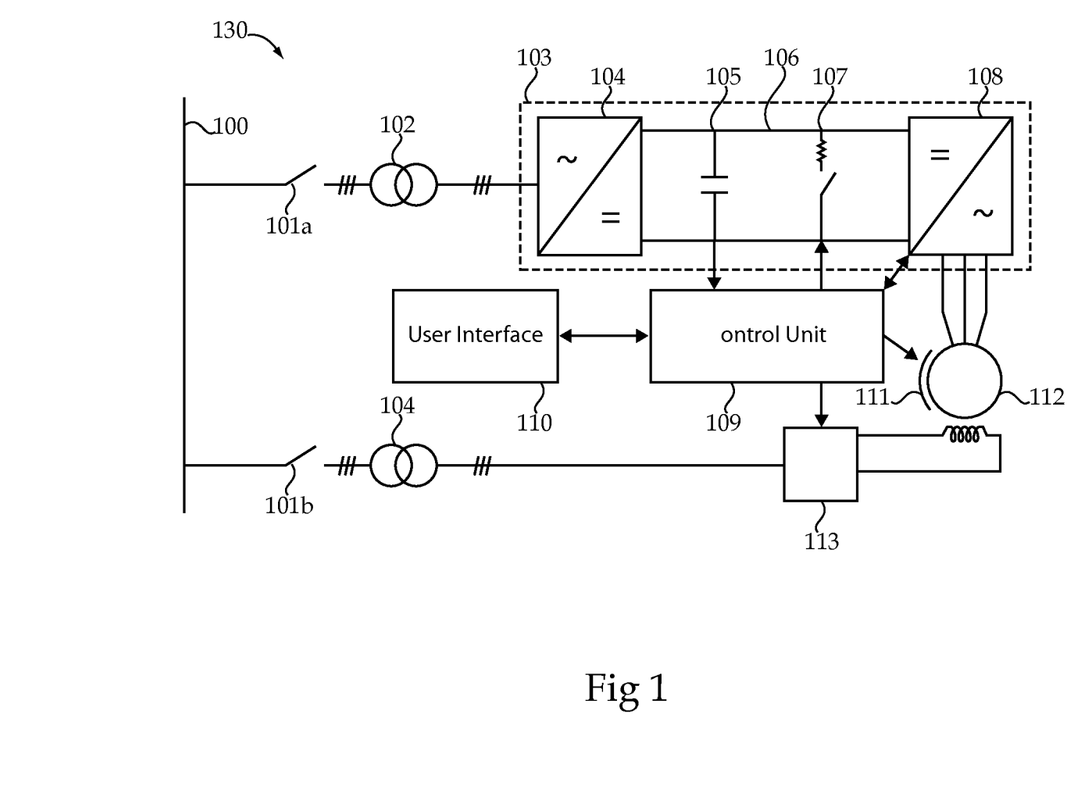
FIG. 1 schematically illustrates some aspects of an exemplary electrically excited synchronous machine (EESM) drive system.

With reference to FIG. 1 there is illustrated an exemplary system 130 for driving an electrically excited synchronous machine (EESM) 112. The illustrated system is structured to receive power from power supply 100 and convert the received power to drive EESM 112. System 130 comprises an AC/AC converter 103 which includes AC/DC converter 104, DC link 106, DC link capacitor 105, energy dissipation circuit 107 and DC/AC converter 108. AC/DC converter 104 may be structured as a passive rectifier, an active rectifier or other type of AC/DC converter. DC/AC converter 108 may be structured as an inverter or other type of DC/AC converter. Energy dissipation circuit 107 may be structured as a breaking chopper unit or another type of power dissipation circuit. System 100 further includes a control unit 109 which is in operative communication with at least converter 108, energy dissipation circuit 107, EESM 112, exciter unit 113, mechanical brake 111 and user interface 110.

Converter 103 is coupled with power supply 100 via transformer 102 and trip device 101a. In the illustrated embodiment power supply 100 is a power grid which supplies three phase AC power. In some embodiments transformer 102 may be structured differently or may be omitted altogether. In further embodiments power supply 100 may be a grid or power generator which supplies other types of AC power such as single phase AC power or other types of polyphase AC power. Still other embodiments may utilize a DC power supply and may include a DC/DC converter instead of AC/DC converter 104 or may directly drive DC bus 105 from a DC power supply. In such embodiments exciter unit 113 may be driven by a separate AC power supply or by an inverter coupled with the DC power supply.

Converter 103 is operatively coupled with stator windings of EESM 112 and is controllable by control unit 109 to supply modulated power to EESM 112 during motor mode operation and to receive power from EESM 112 during generator mode operation. System 100 further includes exciter unit 113 which supplies modulated power to a field winding of EESM 112 and is coupled with power supply 100 via transformer 104 and trip device 101b. In some embodiments transformer 104 may be structured differently or may be omitted altogether. Trip devices 101a and 101b may be used to disconnect the EESM from power supply 100 upon fault condition detection, when the current or voltage flowing through device 101a or 101b exceeds a maximum threshold or falls below a minimum threshold. Various embodiments of trip device 101a and 101b include one or more circuit breakers or other devices with the means to disrupt current flow upon the detection of a fault condition.

Control unit 109 may be structured to provide controls for ride through operation and controlled braking operation of EESM 112 under a power fault condition of power supply 100. It shall be understood that the term power fault condition as used herein refers to a fault condition associated with the power grid, for example, a severe grid voltage drop in one or multiple phases (e.g., a voltage drop of greater than 30%, greater than 40%, or greater than another predetermined percentage or magnitude defined by the voltage drop tolerance of the system and components being powered) or a complete loss of grid voltage (e.g., a grid blackout). During a failure condition converter 103 loses its input supply power, and thus the voltage across DC link capacitor 105 will drop quickly when feeding power to EESM 112 via converter 108. Additionally, the field winding current will decay to zero after exciter unit 113 loses its input power supply. Consequently the available maximum electromagnetic torque (Te) of EESM 112 is limited. Such operation scenarios can cause drive system tripping events in which trip devices 101a and 101b, converter 103, and/or other protective devices are tripped to disconnect power supply 100 from transformers 102 and 104, respectively.

It shall be appreciated that in certain forms, control unit 109 may be operated to prevent or delay a disconnection of the power supply 100 from converter 103 and EESM 112 by maintaining a level of voltage across the DC bus 106 that prevents the activation of the trip devices without requiring use of a supplemental energy storage device such as a an uninterruptable power supply (UPS). In certain forms a supplemental energy storage device such as a UPS may be omitted. In certain forms a supplemental energy storage device such as a UPS may be provided and the frequency or duration of its utilization reduced or minimized.

Control unit 109 may provide ride through operation and/or controlled braking operation for EESM drives during main grid failure to avoid the unnecessary or avoidable tripping events. In certain embodiments system control unit 109 may include software based controls implementing ride through and controlled braking operations in direct torque control (DTC) of system 130 under power supply failure conditions such as main grid failure conditions, covering both motor operating mode and generator operating mode. Ride through operation may use rotating energy in the EESM to keep DC link bus charged via a machine control approach thereby avoiding under voltage protection tripping events. Controlled braking operation preferably makes a controlled stop of EESM 112 in case of a network failure, where the energy may be dissipated at least in part by the power dissipation circuit 107 of DC link 106.

As discussed in more detail below, the EESM is partially controlled by varying the frequency of the current supplied to or drawn from the stator of the EESM. The AC/AC converter 103 performs one of two primary operations depending on the EESM functionality mode. In motor mode, AC from the power supply 100 is converted to DC by converter 104, acting as a rectifier. The current is then inverted by converter 108, acting as an inverter. As the current is inverted, the desired frequency is achieved as described in more detail below. In generator mode, current from the EESM is rectified by converter 108 and inverted by 104. The current from converter 104 has the same frequency as the current of the power supply 100.

The operation of converter 108 may disrupt the flow of current from the rectifier to the inverter, causing transients across the DC bus 106. In normal operation, a primary purpose of the DC link capacitor 105 is to stabilize the voltage across the DC bus 106. In certain embodiments, capacitor 105 comprises a group of capacitors. Following a power fault condition, the DC link capacitor 105 may provide energy storage, but this function is ancillary to the primary purpose of the DC link capacitor 105. The functionality of the DC link capacitor 105 and a supplemental energy storage device, such as an UPS (not illustrated), are distinct. A primary purpose of a UPS is to supply power during a power fault condition. The UPS is additional hardware that may be connected to a DC bus 106, but is not necessary for the AC/AC converter 103 to function during normal operation. Following a power fault condition, a voltage level is maintained across the DC link capacitor 105 to prevent activation of a trip device.

The energy dissipation circuit 107 reduces the voltage within the AC/AC converter 103 to protect against overvoltage conditions. In normal operation, the circuit is inactive. Various embodiments of energy dissipation circuit 107 include multiple resistors, diodes or any other energy dissipation elements and one or more switches or any other device capable of disrupting current flow through the energy dissipation elements of the circuit when the circuit is deactivated. Similar energy dissipation circuits may be provided at other locations in system 130 where excessive voltage can be dissipated so as to prevent damage to the components of system 130.

Converter 108 may function as an inverter converts DC to AC at a frequency determined by the control unit 109. Control unit 109 is in communication with the DC bus 106, energy dissipation circuit 107, at least one converter of converter 103, user interface 110 and mechanical brake 111. In one embodiment, the control unit 109 is within converter 108. In another embodiment, the control unit 109 is within converter 104. In normal operation, the control unit 109 monitors the voltage across the DC bus 106 for a drop in voltage of a predetermined magnitude (e.g., a voltage drop of greater than 30%, greater than 40%, or greater than another predetermined percentage or magnitude defined by the voltage drop tolerance of the converter and/or other system components) which may provide an indication of a power fault condition.

The control unit 109 controls the switches of converter 108 to control the current flow between the AC/AC converter 103 and the EESM using a direct torque control (DTC) controller which receives a torque reference and a flux linkage reference as control inputs. In normal operation, the torque reference values may be determined based upon either a user specified torque reference or a machine speed closed-loop PI(D) controller. It shall be understood that the term PI(D) controller as utilized herein refers to and encompasses proportional integral (PI) controllers, proportional integral derivative (PID) controllers, and variants thereof. The switching logic of converter 108 is controlled by a DTC modulator which receives torque and flux reference values as inputs and generates switching commands based on a predetermined switching scheme, for example, using a look up table that provides DTC-based optimized switching logic or similar switching schemes.

The user interface 110 comprises at least one interface (e.g., touch screen buttons, keys, and the like) for accepting input from a user. The user inputs certain information which can be used by the control unit 109 during a power fault condition. The user may input such information before or during a power fault condition, as will be discussed in more detail below. In one embodiment, the user interface 110 comprises a display for outputting information to the user (e.g., a screen or LED configuration). In one embodiment, the user interface 110 is incorporated into converter 104 or 108.

Following a power fault condition, the control unit 109 maintains the normal operation flux linkage reference value, but the torque reference value may be changed to stop the synchronous machine 112 or to maintain a voltage (Vdc) across the DC bus 106. When the machine 112 is operating as a motor and enters wither a controlled braking mode or a ride through mode, the changed torque reference value may be provided by the output of a Vdc close-loop PI(D) controller. When machine speed is positive, the torque reference provided by the Vdc close-loop PI(D) controller is a small negative value, and when machine speed is negative, the torque reference provided by the Vdc close-loop PI(D) controller is a small positive value. For example, following a power fault condition with positive machine speed, the torque reference value may be changed to a small negative value, between 0 and −0.2 pu, and the switches of converter 108 are controlled by the DTC controller using the output of the Vdc closed loop PI(D) controller as its torque reference input.

When the machine 112 is operating as a generator and enters a controlled braking mode, the torque reference value is set by analytical torque reference calculation to a value between 0 and maximum torque. The value of the maximum analytical torque reference may be determined from the following equations, where $|t_e|_{max}$ is maximum electronic torque, $\delta$ is the load angle for maximum torque, $\psi_s$ is machine stator flux, $l_{sq}$ is q-axis synchronous inductance, $l_{sd}$ is d-axis synchronous inductance, $l_{md}$ is d-axis magnetizing inductances, $i_f$ is field winding current, and $\psi_f$ is the flux defined by the product of $l_{md}$ and $i_f$. Control unit may be structured to implement calculations in accordance with the following equations in order to calculate one or more of these values.

$$|t_e|_{max} = \sin(\delta) \cdot \left[ |\psi_s|^2 \cdot \left( \frac{1}{l_{sq}} - \frac{1}{l_{sd}} \right) \cdot \cos(\delta) + \frac{|\psi_s| \cdot \psi_f}{l_{sd}} \right] \quad \text{(Eq. 1)}$$

$$\cos(\delta) = \frac{-\frac{\psi_f}{l_{sd}} + \sqrt{\frac{\psi_f^2}{l_{sd}^2} + 8 \cdot |\psi_s|^2 \cdot \left( \frac{1}{l_{sq}} - \frac{1}{l_{sd}} \right)^2}}{4 \cdot |\psi_s| \cdot \left( \frac{1}{l_{sq}} - \frac{1}{l_{sd}} \right)} \quad \text{(Eq. 2)}$$

$$\psi_f = l_{md} \cdot i_f \quad \text{(Eq. 3)}$$

In certain embodiments, the control unit 109 seeks to maintain the voltage across the DC bus 106 by setting the torque reference value to a ride through torque reference value. In certain embodiments, the control unit 109 detects a power supply 100 recovery and resumes normal operation of the EESM without stopping the EESM. Certain embodiments of the present invention include a method for stopping an EESM controlled by direct torque control (DTC) following a power fault condition, comprising: setting the torque reference value to value opposing rotation of the machine (e.g., a negative value for positive rotation and a positive value for negative rotation); regulating the voltage across the DC bus 106 using DC/AC converter 108; and applying a mechanical brake 111. In certain embodiments, a control unit 109 decreases the voltage across the DC bus 106 by activating an energy dissipation circuit 107 and increases the voltage across the DC bus 106 by deactivating the energy dissipation circuit 107. Certain embodiments of the present invention include a method for maintaining a connection between a power supply 100 and an EESM connected via a trip device 101a, and an AC/AC converter 103 controlled by a control unit 109 implementing DTC, following a power fault condition, comprising: regulating the voltage across the DC bus 106 of the AC/AC converter 103; checking for a power recovery; and resuming normal operation upon power recovery, wherein, a voltage level is maintained across the DC bus 106 that is sufficient to prevent the trip devices 101a and 101b from activating.

Figure 2:
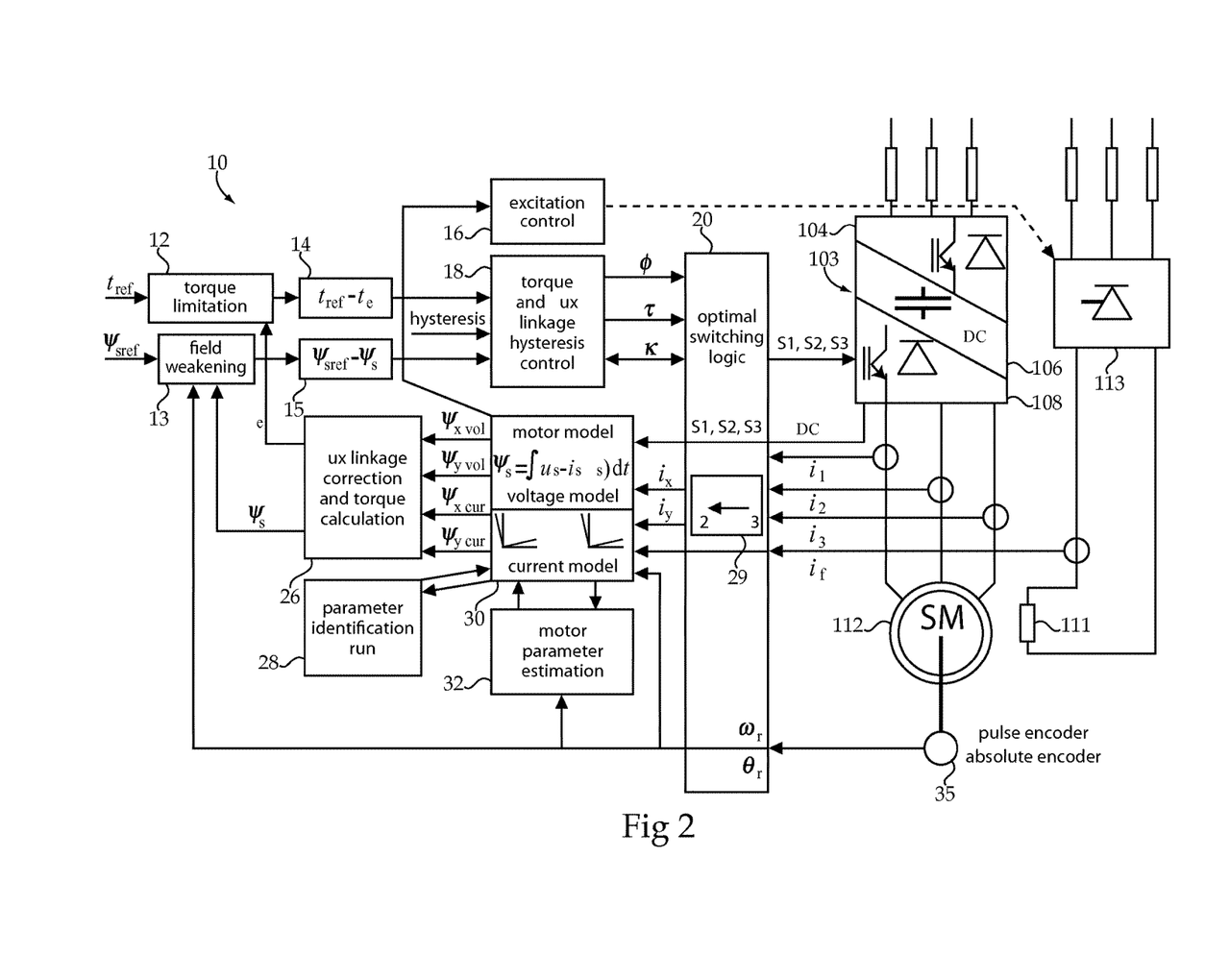
FIG. 2 schematically illustrates some aspects of exemplary controls for an EESM drive system.

With reference to FIG. 2 there is illustrated a schematic block diagram of an exemplary DTC controller 10 which may be implemented in a controller such as control unit 109. Inputs to DTC controller 10 are provided to torque limitation block 12 which receives a torque reference value $t_{ref}$ and a calculated actual torque $t_e$ and provides these values to block 14 which computes an error or difference between the torque reference $t_{ref}$ and actual torque $t_e$ as a function of these inputs ($T_{e\_err} = t_{ref} - t_e$). Field weakening block 13 receives a flux linkage reference value $\Psi_{sref}$ and a calculated actual flux linkage $\Psi_s$ and provides these values to computation block 15 which computes an error or difference between the flux linkage reference and calculated actual flux linkage as a function of these inputs ($\Psi_{s\_err} = \Psi_{sref} - \Psi_s$). The outputs of blocks 14 and 15 are provided to torque and flux linkage hysteresis block 18 along with hysteresis inputs. Block 18 determines the values $\phi$, $\tau$ and $\kappa$, and outputs these values to switching logic block 20 which is structured to determine switching commands for converter 108 based, and to provide switching command signals S1, S2 and S3 to DC/AC converter 108.

Information sensed during the operation of the ESSM drive is provided as feedback to DTC controller 10. Pulse encoder 35 provides encoded data indicative of angular velocity $\omega_r$ and angular position $\theta_r$ of ESSM 112 to blocks 13 and 32, via block 20. DC voltage information $U_{DC}$ and field current information $i_f$ are provided to block 30. Line current information $i_1$, $i_2$ and $i_3$ are provided to block 29 which performs a 3 to 2 transform and outputs current information $i_x$ and $i_y$ (transformed from three signals to two) to block 30. Block 30 is also in two way communication with parameter identification run block 28 and motor parameter estimation block 32 which are used to estimate machine parameters. Block 30 is structured to implement a motor model including a flux linkage model, a voltage model and a current model, and to perform stator flux linkage estimation by using the voltage model and the current model. Block 30 determines flux linkage values $\Psi_{x\_vol}$, $\Psi_{y\_vol}$, $\Psi_{x\_cur}$, $\Psi_{y\_cur}$ based upon the inputs which it receives and outputs these values to flux linkage correction and torque calculation block 26 which calculates an actual flux linkage $\Psi_s$ and an actual torque $t_e$ and provides those values to blocks 12 and 13. Block 30 also outputs a control signal to block 16 which provides a field winding exciter control signal to exciter unit 113.

Figure 3:
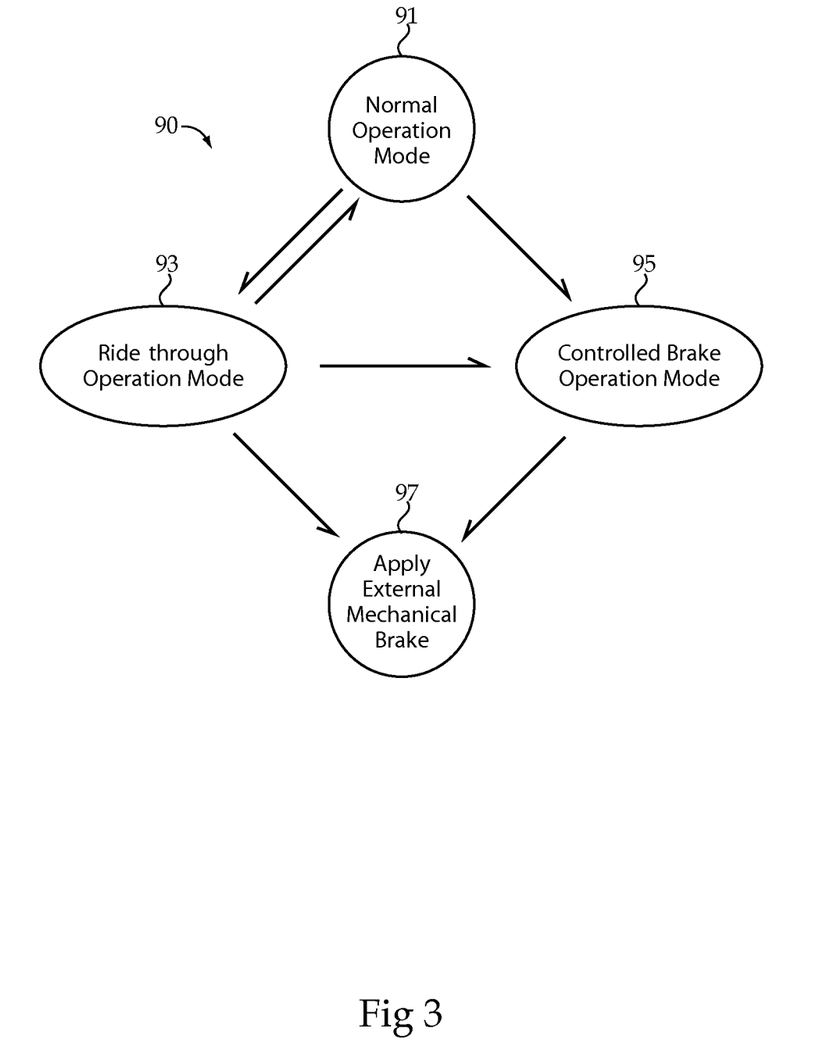
FIG. 3 illustrates an exemplary operational state diagram for an EESM drive system.

With reference to FIG. 3 there is illustrated an exemplary operational state diagram 90 for an EESM drive system. Diagram 90 illustrates four states: normal operation mode 91, ride through operation mode 93, controlled braking operation mode 95 and apply external mechanical brake mode 97, it being understood that other modes and sub-modes are also contemplated in various embodiments. As illustrated in FIG. 3, from mode 91, the state of the EESM system may change to mode 93 or mode 95. From mode 93, the state of the EESM system may change to mode 91, mode 95 or mode 97. From mode 95 the state of the EESM system may change to mode 97. The states and state transitions illustrated in diagram 90 may apply to both motor mode operation and generator mode operation. Thus, mode 93 may be referred to as motor ride through mode when the system is operating as a motor and as generator ride through mode when the system is operating as a generator. Similarly, mode 95 may be referred to as motor controlled braking mode when the system is operating as a motor and generator controlled braking mode when the system is operating as a generator.

Motor ride through mode attempts to prevent or delay the under voltage activation of trip device 101a or other system components by maintaining a voltage level across the DC bus using the inertia of EESM 112 to generate current that flows to the DC/AC converter 108. In motor ride through mode, energy from the inertia of the EESM may be captured to provide ride-through power to converter 108 and DC bus 106. A motor ride through mode torque reference value may be provided by the output of the Vdc close-loop PI(D) controller. When machine speed is positive, the torque reference provided by the PI(D) controller is a small negative value, and when machine speed is negative, the torque reference provided by the PI(D) controller is a small positive value. The user may request a transfer to controlled braking mode by providing a control signal or command. The control unit may also monitor the DC bus voltage to detect a power recovery. Power recovery may also be detected by other methods such as monitoring AC grid voltage. In the event of a power recovery, the PI(D) controller may be reset and normal operations may be resumed. When the angular velocity of the EESM reaches a user defined threshold, the control unit applies the mechanical brake, stops the EESM and waits for a power recovery. One example of a controls process implementing these motor ride through mode features is illustrated and described in connection with FIG. 4, it being appreciated that these features may also be implemented in a number of alternative controls processes and are not so limited.

Generator ride through mode attempts to maintain operation of the machine as a generator and regulates a voltage level across the DC bus 106 using an energy dissipation circuit 107. A generator ride through mode torque reference value may be provided using a machine speed closed loop PI(D) controller or based upon a user specified torque reference. The user may request a transfer to controlled braking mode by providing a control signal or command. The control unit may also monitor the DC bus voltage to detect a power recovery. Power recovery may also be detected by other methods such as monitoring AC grid voltage. In the event of a power recovery, and normal operations may be resumed. When the time duration of generator mode ride through operation reaches a user defined threshold, the control unit transitions system operation to the controlled braking mode an monitors a rotational characteristic of the EESM. When the rotational characteristic meets a user defined criteria the control unit applies a mechanical brake to stops the EESM and waits for a power recovery. One example of a controls process implementing these generator ride through mode features is illustrated and described in connection with FIG. 4, it being appreciated that these features may also be implemented in a number of alternative controls processes and are not so limited.

Motor controlled braking mode attempts to slow rotation of the machine using a combination of load torque and electromechanical torque. A motor controlled braking mode torque reference value may be provided by the output of the Vdc close-loop PI(D) controller. After controlled braking is initiated, the system monitors a rotational characteristic of the machine (e.g., angular velocity) and applies a mechanical brake once the rotational characteristic reaches a user defined threshold. One example of a controls process implementing these motor controlled braking mode features is illustrated and described in connection with FIG. 4, it being appreciated that these features may also be implemented in a number of alternative controls processes and are not so limited.

Generator controlled braking mode attempts to slow rotation of the machine using a DC/AC converter to provide electromechanical torque to stop or slow the EESM. A generator controlled braking mode torque reference value may be provided by an analytical calculation such as the example calculations disclosed herein. After controlled braking is initiated, the system monitors a rotational characteristic of the machine (e.g., angular velocity) and applies a mechanical brake once the rotational characteristic reaches a user defined threshold. One example of a controls process implementing these generator controlled braking mode features is illustrated and described in connection with FIG. 4, it being appreciated that these features may also be implemented in a number of alternative controls processes and are not so limited.

Figure 4:
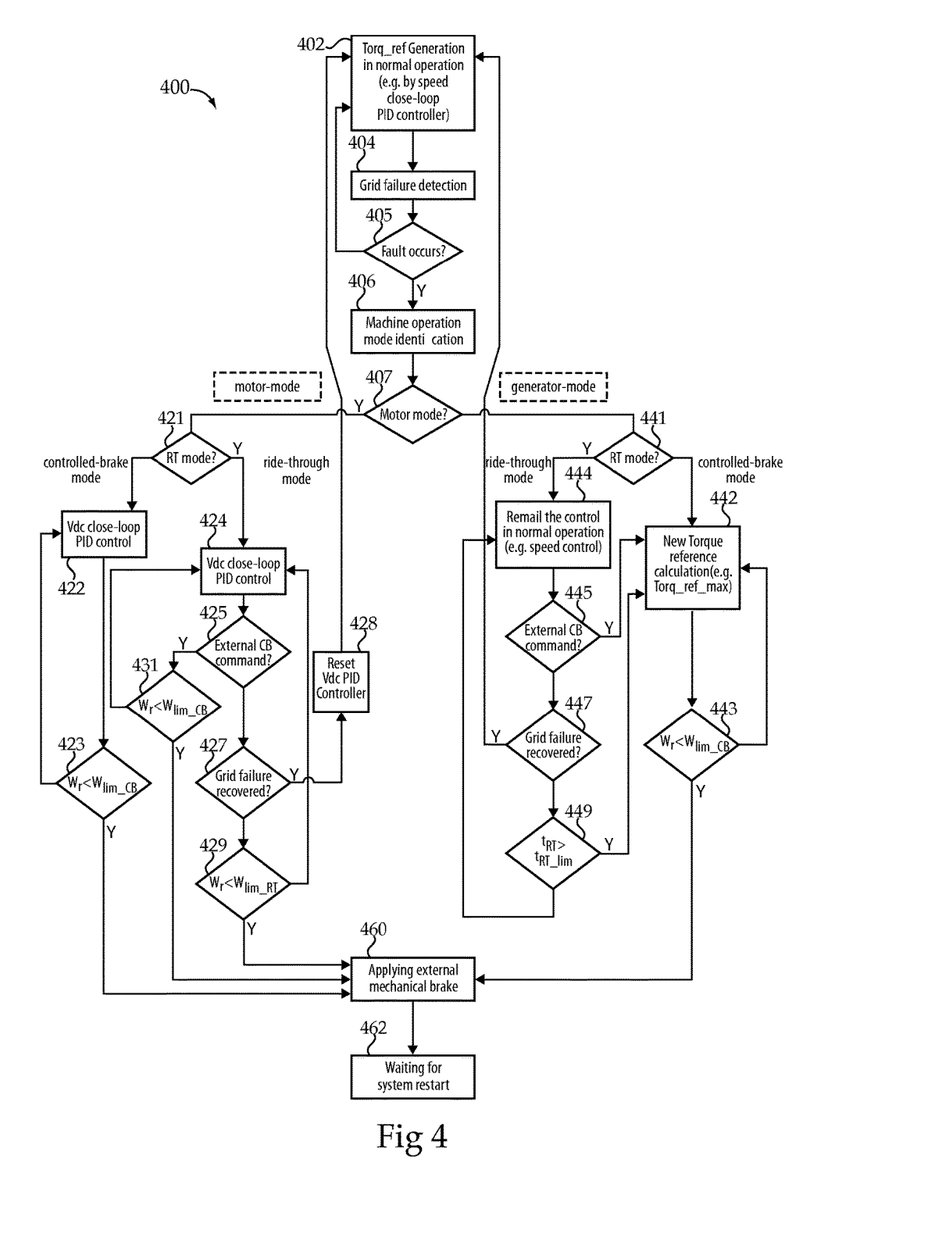
FIG. 4 illustrates an exemplary controls process for an EESM drive system.

With reference to FIG. 4, there is illustrated a flow diagram illustrating an exemplary controls process 400 which may be implemented in a controller such as control unit 109. In the illustrated embodiment, process 400 starts at operation 402 which generates a torque reference value in a normal operating mode. In the normal mode, the torque reference value may be determined using a machine speed closed loop PI(D) controller or based upon a user specified torque reference. From operation 402 process 400 proceeds to operation 404 which receives information from which a power supply failure condition (e.g. a grid failure condition) may be evaluated. In certain forms the received information may include one or more values indicative of voltage across a DC link of a converter. Other forms may monitor the AC grid voltage directly or via one or more additional components or systems connected to the AC grid. From operation 404, process 400 proceeds to conditional 405 which evaluates whether a power supply failure condition has occurred. In certain embodiments, conditional 405 may evaluate occurrence of a power supply condition by comparing one or more received values to a threshold. In certain forms the values of information indicative of voltage across a DC link of a converter are compared with a minimum threshold to evaluate a power supply failure condition. Other forms may monitor the AC grid voltage directly or via one or more additional components or systems connected to the AC grid.

From conditional 405, process 400 proceeds to operation 406 which receives information indicative of an EESM system operating mode which may be, for example, an operating mode state value or flag, or a sensed or measured parameter indicative of the operational state of an EESM system. From operation 406, process 400 proceeds to conditional 407 which evaluates the operating mode of the EESM system. In the illustrated embodiment, conditional 407 is structured to evaluate whether the EESM system is operating in motor mode. In other embodiments, conditional 407 is structured to evaluate whether the EESM system is operating in generator mode. Further embodiments may utilize additional or alternate evaluations which may account for additional potential operating modes such as start up, trip, failure or other modes.

If conditional 407, determines that the EESM system is operating in a motor mode, process 400 proceeds to conditional 421 which evaluates whether motor mode ride through operation should be initiated. This evaluation may be made, for example, based upon the presence of a command or signal to initiate controlled braking mode which may be provided by a user or supervisory controls of a controller such as control unit 109. If conditional 421 determines that motor mode ride through operation should be initiated, process 400 proceeds to operation 424 which utilizes a Vdc closed loop PI(D) control to generate a torque reference which is used as the torque reference input to a DTC controller to control converter switching operation.

From operation 424, process 400 proceeds to conditional 425 which evaluates whether an external (e.g., user initiated, or supervisory control system initiated) controlled braking command is true. If conditional 425 determines that an external controlled braking command is present, process 400 proceeds to conditional 431 which evaluates whether angular velocity of the EESM ($W_r$) is less than a limit ($W_{lim\_CB}$). If the angular velocity of the EESM is not below the limit, process 400 proceeds to operation 424. If the angular velocity of the EESM is below the limit, process 400 proceeds to operation 460 which applies an external mechanical brake to stop rotation of the EESM and then to operation 462 which waits and/or monitors for a system restart condition.

If conditional 425 determines that an external controlled braking command is not present, process 400 proceeds to conditional 427 which evaluates whether a grid failure recovery condition is true. If the grid recovery failure condition is true, process 400 proceeds to operation 428 which resets the Vdc PI(D) controller to a normal operating mode and then proceeds to operation 402. If the grid recovery failure condition is not true, process 400 proceeds to conditional 429 which evaluates whether angular velocity of the EESM ($W_r$) is less than a limit ($W_{lim\_RT}$). If the angular velocity of the EESM is not below the limit, process 400 proceeds to operation 424. If the angular velocity of the EESM is below the limit, process 400 proceeds to operation 460 which applies an external mechanical brake to stop rotation of the EESM. From operation 460, process 400 proceeds to operation 462 which waits and/or monitors for a system restart condition.

If conditional 407, determines that the EESM system is not operating in a motor mode (indicating that it is operating in generator mode in the illustrated embodiment), process 400 proceeds to conditional 441 which further evaluates whether generator mode ride through operation should be initiated. This evaluation may be made, for example, based upon the presence of a command or signal to initiate controlled braking mode which may be provided by a user or supervisory controls of a controller such as control unit 109. If conditional 441 determines that generator mode ride through operation should be initiated, process 400 proceeds to operation 444 which continues to operate the EESM system in the normal mode described above in connection with operation 402 and dissipates energy supplied to converter 103 by machine 112 by operating energy dissipation circuit 107.

From operation 444, process 400 proceeds to conditional 445 which evaluates whether an external controlled braking command is present. If an external controlled braking command is present, process 400 proceeds to operation 442. If an external controlled braking command is not present, process 400 proceeds to conditional 447 which evaluates whether a grid a grid failure recovery condition is true. If the grid recovery failure condition is true, process 400 proceeds to operation 402. If the grid recovery failure condition is not true, process 400 proceeds to conditional 449 which evaluates whether the time that the system has been in generator mode ride through operation ($t_{RT}$) is greater than a limit ($t_{RT\_lim}$). If the time duration of generator mode ride through operation is greater than the limit, process 400 proceeds to operation 442. If the time duration of generator mode ride through operation is not greater than the limit, process 400 proceeds to operation 444.

Operation 442 performs a new torque reference calculation, for example, calculating the value of a maximum torque reference (Torq_ref_max). From operation 442, process 400 proceeds to conditional 443 which evaluates whether angular velocity of the EESM ($W_r$) is less than a limit ($W_{lim\_CB}$). If the angular velocity of the EESM is not below the limit, process 400 proceeds to operation 442. If the angular velocity of the EESM is below the limit, process 400 proceeds to operation 460 which applies an external mechanical brake to stop rotation of the EESM. From operation 460, process 400 proceeds to operation 462 which waits and/or monitors for a system restart condition.

Further written description of a number of exemplary embodiments shall now be provided. One embodiment is a method comprising: operating an electrically excited synchronous machine (EESM) system in a first control mode, the system including a converter operatively coupled with one or more stator windings, an exciter operatively coupled with one or more field windings, a control system operatively coupled with the converter and the exciter and including a DTC controller structured to receive a torque reference input and to provide switching commands to the converter, and a power supply operatively coupled with the converter and the exciter, the first control mode providing a first torque reference to the DTC controller; determining with the control system whether a power supply fault condition exists; determining with the control system whether the EESM system is operating in one of a motor mode and a generator mode; if the power supply fault condition exists and the EESM system is operating in the motor mode, entering one of a motor ride through control mode and a motor controlled braking control mode, the motor ride through control mode and the motor controlled braking control mode providing a second torque reference to the DTC controller, the second torque reference being determined differently from the first torque reference; and if the power supply fault condition exists and the EESM system is operating in the generator mode, entering one of a generator ride through control mode and a generator controlled braking control mode, the generator ride through control mode providing the first torque reference to the DTC controller, and the generator controlled braking control mode providing a third torque reference to the DTC controller, the third torque reference being determined differently from the first torque reference and the second torque reference.

In certain forms of the foregoing method, the first torque reference is determined using one of a machine speed closed loop PI(D) controller and a user specified value. In certain forms, the motor ride through control mode is structured to maintain a voltage of a DC link of the converter (Vdc) above a target level, to evaluate a power fault recover condition to determine whether to return to the first control mode, to evaluate a user command to determine whether to initiate a controlled braking mode, and to evaluate a rotation characteristic of the EESM system to determine whether to initiate mechanical braking. In certain forms the motor ride through control mode utilizes a Vdc closed loop controller to determine the second torque reference provided to the DTC controller. In certain forms the motor controlled braking control mode is structured to maintain a voltage of a DC link of the converter (Vdc) above a target level by providing a torque reference value determined by a Vdc closed loop controller to the DTC controller, and to evaluate a rotation characteristic of the EESM system to determine whether to initiate mechanical braking. In certain forms the generator ride through control mode is structured to operate an energy dissipation circuit to control a voltage of a DC link of the converter (Vdc), to evaluate a power fault recover condition to determine whether to return to the first control mode, and to evaluate a time duration of generator ride through control mode operation to determine whether to transition to the generator controlled braking control mode. In certain forms the generator controlled braking control mode utilizes an analytical calculation to determine the third torque reference provided to the DTC controller. In certain forms the generator controlled braking control attempts to slow rotation of the EESM system first using an electromagnetic torque of the converter and second using a mechanical brake.

Another exemplary embodiment is a system comprising: an electrically excited synchronous machine (EESM); a converter including an inverter operatively coupled with one or more stator windings of the EESM and a DC link operatively coupled with the inverter and a power supply; an exciter operatively coupled with one or more field windings of the EESM and operatively coupled with the power supply; and a control system operatively coupled with the converter, the controller structured to: control operation of the converter in a normal operating mode; evaluate whether a power fault condition exists, evaluate an operating mode of the EESM, selectably control operation of the converter in one of a first ride through mode and a first controlled braking mode if the power fault condition exists and the EESM is operating as a motor, and selectably control operation of the converter in one of a second ride through mode and a second controlled braking mode if the power fault condition exists and the EESM is operating as a generator.

In certain forms of the foregoing system, the first ride through mode and the first controlled braking mode, the control system attempts to control a voltage of a DC link of the converter (Vdc) by determining a torque reference using a Vdc closed loop PI(D) controller, providing the torque reference as an input to a DTC controller, and providing switching commands to the converter from the DTC controller. In certain forms the control system is structured to selectably transition operation of the system from the first controlled braking mode to a mechanical braking mode, and to selectably transition operation of the system from the first ride through mode to the mechanical braking mode or to the normal operating mode. In certain forms the second ride through control mode the control system determines a torque reference using one of a machine speed closed loop PI(D) controller and a user specified value, provides the torque reference as an input to a DTC controller, and provides switching commands to the converter from the DTC controller. In certain forms in the second controlled braking control mode the control system determines a torque reference using an analytical torque calculation, provides the torque reference as an input to a DTC controller, and provides switching commands to the converter from the DTC controller. In certain forms the control system is structured to selectably transition operation of the system from the second controlled braking mode to a mechanical braking mode, and to selectably transition operation of the system from the second ride through mode to the second controller braking mode or to the normal operating mode.

A further exemplary embodiment is a drive for an electrically excited synchronous machine (EESM) including one or more stator windings and one or more field windings, the drive comprising: a stator winding drive portion including an inverter operatively coupled with a DC link and an energy dissipation circuit; a field winding exciter portion; and a controller structured to control the stator winding drive portion according to one of: a first mode in which the stator winding drive portion and the field winding drive portion are controlled to provide power output and the controller selectably initiates one of a first ride through operation and a first controlled braking operation based upon existence of a power supply error condition, and a second mode in which the stator winding drive portion and the field winding drive portion are controlled to receive power input and the controller selectably initiates one of a second ride through operation and a second controlled braking operation based upon existence of the power supply error condition.

In certain forms of the foregoing drive the first ride through operation and the first controlled braking operation utilize a Vdc closed loop PI(D) controller to determine torque reference values used in controlling switching of the converter. In certain forms the second ride through operation utilizes one of a machine speed closed loop PI(D) controller and an operator supplied value to determine torque reference values used in controlling switching of the converter. In certain forms the second controlled braking operation utilizes an analytical calculation to determine torque reference value used in controlling switching of the converter. In certain forms the inverter is operatively coupled one or more stator windings of an EESM, the DC link is operatively coupled with a power supply via one or more converters, the field winding exciter portion is operatively coupled with one or more field windings of an EESM and operatively coupled with the power supply. In certain forms the power supply comprises a utility power grid. In certain forms during the first ride through operation, the controller is structured to return system operation to the first mode based upon a power supply recovery condition, to transition system operation to a controlled braking mode based on a user command, or to transition system operation to a mechanical braking mode based upon an evaluation of a rotational condition of the EESM. In certain forms during the first ride through operation, if a grid failure recovery condition is true, the controller issues a PI(D) controller reset command and transitions to either a motor mode operation, and if the grid failure recovery condition is not true the controller evaluates whether an angular velocity of the EESM is less than a limit, continues the first ride through operation if the angular velocity of the EESM is not less than the limit, and initiates a mechanical braking operation if the angular velocity of the EESM is less than the limit. In certain forms during the second ride through operation, the controller is structured to transition system operation to the first mode based upon a power supply recovery condition, or to transition to the second controlled braking mode based upon a time limit for the second ride though operation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:
1. A method comprising:
operating an electrically excited synchronous machine (EESM) system in a first control mode, the system including a converter operatively coupled with one or more stator windings, an exciter operatively coupled with one or more field windings, a control system operatively coupled with the converter and the exciter and including a DTC controller structured to receive a torque reference input and to provide switching commands to the converter, and a power supply operatively coupled with the converter and the exciter, the first control mode providing a first torque reference to the DTC controller;
determining with the control system whether a power supply fault condition exists;

determining with the control system whether the EESM system is operating in one of a motor mode and a generator mode;

if the power supply fault condition exists and the EESM system is operating in the motor mode, entering one of a motor ride through control mode and a motor controlled braking control mode, the motor ride through control mode and the motor controlled braking control mode providing a second torque reference to the DTC controller, the second torque reference being determined differently from the first torque reference; and if the power supply fault condition exists and the EESM system is operating in the generator mode, entering one of a generator ride through control mode and a generator controlled braking control mode, the generator ride through control mode providing the first torque reference to the DTC controller, and the generator controlled braking control mode providing a third torque reference to the DTC controller, the third torque reference being determined differently from the first torque reference and the second torque reference.

2. The method of claim 1 wherein the first torque reference is determined using one of a machine speed closed loop PI(D) controller and a user specified value.

3. The method of claim 1 wherein the motor ride through control mode is structured to maintain a voltage of a DC link of the converter (Vdc) above a target level, to evaluate a power fault recover condition to determine whether to return to the first control mode, to evaluate a user command to determine whether to initiate a controlled braking mode, and to evaluate a rotation characteristic of the EESM system to determine whether to initiate mechanical braking.

4. The method of claim 3 wherein the motor ride through control mode utilizes a Vdc closed loop controller to determine the second torque reference provided to the DTC controller.

5. The method of claim 1 wherein the motor controlled braking control mode is structured to maintain a voltage of a DC link of the converter (Vdc) above a target level by providing a torque reference value determined by a Vdc closed loop controller to the DTC controller, and to evaluate a rotation characteristic of the EESM system to determine whether to initiate mechanical braking.

6. The method of claim 1 wherein the generator ride through control mode is structured to operate an energy dissipation circuit to control a voltage of a DC link of the converter (Vdc), to evaluate a power fault recover condition to determine whether to return to the first control mode, and to evaluate a time duration of generator ride through control mode operation to determine whether to transition to the generator controlled braking control mode.

7. The method of claim 1 wherein the generator controlled braking control mode utilizes an analytical calculation to determine the third torque reference provided to the DTC controller.

8. The method of claim 1 wherein the wherein the generator controlled braking control attempts to slow rotation of the EESM system first using an electromagnetic torque of the converter and second using a mechanical brake.

9. A system comprising:
an electrically excited synchronous machine (EESM);
a converter including an inverter operatively coupled with one or more stator windings of the EESM and a DC link operatively coupled with the inverter and a power supply;

an exciter operatively coupled with one or more field windings of the EESM and operatively coupled with the power supply; and a control system operatively coupled with the converter, the control system structured to:

control operation of the converter in a normal operating mode;

evaluate whether a power fault condition exists, evaluate an operating mode of the EESM, selectably control operation of the converter in one of a first ride through mode and a first controlled braking mode if the power fault condition exists and the EESM is operating as a motor, and selectably control operation of the converter in one of a second ride through mode and a second controlled braking mode if the power fault condition exists and the EESM is operating as a generator.

10. The system of claim 9 wherein in the first ride through mode and the first controlled braking mode, the control system attempts to control a voltage of a DC link of the converter (Vdc) by determining a torque reference using a Vdc closed loop PI(D) controller, providing the torque reference as an input to a DTC controller, and providing switching commands to the converter from the DTC controller.

11. The system of claim 9 wherein the control system is structured to selectably transition operation of the system from the first controlled braking mode to a mechanical braking mode, and to selectably transition operation of the system from the first ride through mode to the first controlled braking mode, to the mechanical braking mode or to the normal operating mode.

12. The system of claim 9 wherein the second ride through control mode the control system determines a torque reference using one of a machine speed closed loop PI(D) controller and a user specified value, provides the torque reference as an input to a DTC controller, and provides switching commands to the converter from the DTC controller.

13. The system of claim 9 wherein in the second controlled braking control mode the control system determines a torque reference using an analytical torque calculation, provides the torque reference as an input to a DTC controller, and provides switching commands to the converter from the DTC controller.

14. The system of claim 9 wherein the control system is structured to selectably transition operation of the system from the second controlled braking mode to a mechanical braking mode, and to selectably transition operation of the system from the second ride through mode to the second controller braking mode or to the normal operating mode.

15. A drive for an electrically excited synchronous machine (EESM) including one or more stator windings and one or more field windings, the drive comprising:

a stator winding drive portion including an inverter operatively coupled with a DC link and an energy dissipation circuit;

a field winding exciter portion; and a controller structured to control the stator winding drive portion according to one of:

a first mode in which the stator winding drive portion and the field winding drive portion are controlled to provide power output and the controller selectably initiates one of a first ride through operation and a first controlled braking operation based upon existence of a power supply error condition, and a second mode in which the stator winding drive portion and the field winding drive portion are controlled to receive power input and the controller selectably initiates one of a second ride through operation and a second controlled braking operation based upon existence of the power supply error condition.

16. The drive of claim 15 wherein the first ride through operation and the first controlled braking operation utilize a Vdc closed loop PI(D) controller to determine torque reference values used in controlling switching of the converter.

17. The drive of claim 15 wherein the second ride through operation utilizes one of a machine speed closed loop PI(D) controller and an operator supplied value to determine torque reference values used in controlling switching of the converter.

18. The drive of claim 15 wherein the second controlled braking operation utilizes an analytical calculation to determine torque reference value used in controlling switching of the converter.

19. The drive of claim 15 wherein the inverter is operatively coupled one or more stator windings of an EESM, the DC link is operatively coupled with a power supply via one or more converters, the field winding exciter portion is operatively coupled with one or more field windings of an EESM and operatively coupled with the power supply.

20. The drive of claim 19 wherein the power supply comprises a utility power grid.

21. The drive of claim 15 wherein during the first ride through operation, the controller is structured to return system operation to the first mode based upon a power supply recovery condition, to transition system operation to a controlled braking mode based on a user command, or to transition system operation to a mechanical braking mode based upon an evaluation of a rotational condition of the EESM.

22. The drive of claim 15 wherein during the first ride through operation, if a grid failure recovery condition is true, the controller issues a PI(D) controller reset command and transitions to either a motor mode operation —, and if the grid failure recovery condition is not true the controller evaluates whether an angular velocity of the EESM is less than a limit, continues the first ride through operation if the angular velocity of the EESM is not less than the limit, and initiates a mechanical braking operation if the angular velocity of the EESM is less than the limit.

23. The drive of claim 15 wherein during the second ride through operation, the controller is structured to transition system operation to the first mode based upon a power supply recovery condition, or to transition to the second controlled braking mode based upon a time limit for the second ride though operation.

24. The drive of claim 15 wherein during the second controlled braking mode an analytically determined torque reference is input to a DTC controller to provide electrical braking until a mechanical braking threshold is reached at which time a mechanical braking operation is initiated.

* * * * *